(12) United States Patent
Duhaime et al.

(10) Patent No.: US 7,873,577 B1
(45) Date of Patent: Jan. 18, 2011

(54) SENSITIVE DATA ALIASING FOR TRANSACTION-CARD AND OTHER APPLICATIONS

(75) Inventors: David A. Duhaime, Eden Prairie, MN (US); Brad J. Duhaime, Maple Grove, MN (US)

(73) Assignee: Aspect Loss Prevention, LLC, Bloomington, MN (US)

( * ) Notice: Subject to any disclaimer, the term of this patent is extended or adjusted under 35 U.S.C. 154(b) by 1062 days.

(21) Appl. No.: 11/372,736

(22) Filed: Mar. 10, 2006

Related U.S. Application Data (60) Provisional application No. 60/763,048, filed on Jan. 27, 2006.

(51) Int. Cl.
*G06F 21/00* (2006.01)
(52) U.S. Cl. .............................. 705/50; 705/51; 705/74
(58) Field of Classification Search .................. 705/50, 705/51, 74
See application file for complete search history.

(56) References Cited

U.S. PATENT DOCUMENTS

| | | | | |
|---|---|---|---|---|
| 6,847,393 | B2* | 1/2005 | Ashe et al. | 348/61 |
| 7,275,685 | B2* | 10/2007 | Gray et al. | 235/380 |
| 2004/0069845 | A1* | 4/2004 | Goldstein et al. | 235/380 |
| 2005/0035192 | A1* | 2/2005 | Bonalle et al. | 235/379 |
| 2008/0048025 | A1* | 2/2008 | Fitzgerald et al. | 235/380 |
| 2009/0119194 | A1* | 5/2009 | Chau et al. | 705/35 |

* cited by examiner

*Primary Examiner*—Pierre E Elisca
(74) *Attorney, Agent, or Firm*—Crawford Maunu PLLC (57) ABSTRACT

Database management and security is implemented in a variety of embodiments. In one such embodiment, data sets containing retail transaction information are analyzed using aliases representing transaction card identifiers. In another embodiment, the transaction card identifiers are stored in an encrypted form for use from a secure access, while the alias identifier is available for standard access.

6 Claims, 4 Drawing Sheets

SENSITIVE DATA ALIASING FOR TRANSACTION-CARD AND OTHER APPLICATIONS

RELATED PATENT DOCUMENTS

This patent document claims the benefit, under 35 U.S.C. §119(e), of U.S. Provisional Patent Application No. 60/763,048 filed on Jan. 27, 2006 and entitled: "Sensitive Data Aliasing and Implementations Thereof."

FIELD OF THE INVENTION

The present invention relates generally to approaches to database management, and more particularly, to a sensitive data aliasing procedure that facilitates implementing sensitive databases for transaction-card and related applications.

BACKGROUND

Databases are used for a large number of different applications. In some instances, the databases can be used to store sensitive information that calls for a measure of security. Depending upon the importance of the information and the potential for misuse of the information, different levels of security are implemented. One type of information that typically requires a high level of security is financial information, such as transaction card account identifiers.

Transaction cards are used by consumers in a variety of avenues, such as online purchases, in-store purchases, over-the-phone purchases, and cash advances. Many of these avenues involve the use of transaction cards for retail purchases. Some retailers maintain databases that contain information related to consumer transaction card use, such as the transaction card account details or identifiers. The retailers use the databases for a variety of purposes, including consumer dispute resolution, consumer refunds, fraud detection, and customer purchase tracking.

There has been growing concern, however, in the prevention of unauthorized access to transaction card identifiers, and individual card holders are instructed to keep their transaction card identifiers private. The concern is magnified where an unauthorized person has access to a database containing multiple transaction card identifiers. Such an unauthorized person could commit transaction card fraud, identity theft, or other illegal activities with any of the transaction card identifiers. For this reason, unauthorized access to a database containing transaction card identifiers can potentially lead to large economic consequences for transaction card holders, financial companies that issue transaction cards, retailers, and others.

In addition, the capacity for transaction card fraud has increased with the growing use of the Internet. If databases are accessible from a system that has a link to the Internet, the potential security issues increase because an unauthorized person may be able to access the database from a distant location. Accordingly, databases that contain transaction card information often implement costly security measures to prevent transaction card fraud.

Examples of security measures used include implementing a firewall or a similar method of limiting external access, password protecting the database, limiting the amount of transaction card data stored, not storing unnecessary information, encrypting the transaction card identifiers, and masking the account identifiers.

Several of the security measures can adversely affect the functionality of the database. For example, limiting the amount of transaction card identifiers stored often can be accomplished by only retaining the identifiers for a limited period of time; however, a retailer may have a need for accessing information related to events that occurred prior to the limited time period. In another example, the transaction card data can be encrypted in the database using an encryption method, such as AES (Advanced Encryption Standard) cryptography or similar method. Unfortunately, after a transaction card identifier is encrypted by such methods, the encrypted result is often a large binary string, and thus, contains characters that cannot be displayed and that can be difficult to store and manipulate because of the encrypted format. Moreover, database transactions involving the encrypted transaction card identifiers can require large amounts of computing power and time, and produce erroneous data that in various applications can cause the applications to function incorrectly. In addition, many encryption methods use a key to create the encrypted data. If the key is changed, all of the encrypted data must also be changed. This can create compatibility issues between the old and new encrypted values.

When the transaction card information is masked for display purposes (e.g., replaced with "*" or other unrelated markers), masking the information can reduce the usefulness of the display. For example, a viewer is not able to look through a listing of transactions for identical transaction card identifiers if the identifiers are masked. Moreover, if partial masking of the identifiers is used, the uniqueness of each transaction card identifier may be lost.

These and other issues have presented challenges to the implementation of secure databases, including those involving transaction card identifiers and similar information.

SUMMARY

The claimed invention is directed to overcoming some of the aforementioned challenges and others related to the storage and utilization of sensitive information. The present invention is exemplified in a number of implementations and applications, some of which are summarized below.

Various example embodiments of the present invention are directed to the facilitation of the creation and utilization of secure, computer-managed databases.

According to another example embodiment of the present invention, a method is employed for facilitating the storage and use of transaction card identifiers. As a transaction card identifier is received, it is encrypted using an acceptable encryption technique. The format of the encrypted data is modified to facilitate storage and manipulation of the data. Alias identifiers (e.g., alphanumeric and other representations) are assigned to represent the transaction card identifiers, and for most accesses, the alias identifiers are used in place of the transaction card identifiers.

According to another example embodiment of the present invention, a system is arranged to facilitate the storage and utilization of transaction card identifiers. The system receives the transaction card identifiers along with other data associated with the transaction card. The system uses software or hardware encryption techniques to encrypt the transaction card identifier. A database stores the encrypted transaction card identifiers once the encrypted transaction card identifiers are formatted in accordance with the database requirements. The system creates an alias identifier corresponding to each formatted transaction card identifier and, for certain types of access requests, provides the alias identifier in place of the transaction card identifier.

Another embodiment uses data sets associated with transaction card identifiers that have been used in a retail environment. Encrypted forms of the transaction card identifiers are associated with alias identifiers, and the alias identifiers are used to analyze retail-environment aspects of the data sets independent of both encrypted and unencrypted forms of the transaction card identifiers.

In another embodiment of the present invention, the method includes coding, at compile time, a unique identifier for each customer in a software application. The software application uses the unique identifier to generate an encryption key from a pass phrase entered by the customer. This method allows for two different customers to have the same pass phrase but still have a different encryption scheme. The software application can then use the encryption key to encrypt the transaction card identifiers.

According to another example embodiment, the user can select a user identification and password for accessing the database. The user identification and password are saved in an encrypted file and transferred to a third party. The third party can use the encrypted file to provide the secure access settings of the database during, for example, installation of a database management system. Alternatively, the third party may use the encrypted file after installation to modify the secure access settings of the database. The system then uses the user identification and password to access the database.

Another embodiment generates a hash value for the encrypted transaction card identifiers. A system then uses the hash value for database processing, such as data searching or sorting.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

While the invention is amenable to various modifications and alternative forms, specifics thereof have been shown by way of example in the drawings and will be described in detail. It should be understood, however; that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different applications, and the invention has been found to be particularly suited for use with a computer-implemented management of databases containing retail-type transaction card information, such as credit/debit card account numbers and related information. While the present invention is not necessarily limited to such applications, various aspects of the invention may be appreciated through a discussion of various examples using this context.

One embodiment uses data sets associated with such transaction card identifiers that are used in a retail environment. For example, when a holder of a transaction card wishes to purchase a good or service from a retailer, the holder has an expectation that the identifier will not be used for illegitimate purposes. With this expectation, the holder presents the transaction card identifier (e.g., via magnetic swiping or entering the identifier for an online purchase) for a retail purchase. The transaction card identifier and related information, such as date of sale, purchase price, and item purchased, are typically processed to perfect the transaction (e.g., via a conventional Automated Clearing House) and stored for management/record-keeping purposes. In accordance with the present invention, the card-holders expectation of legitimate use can be satisfied while still permitting limited use of the stored information. A computer, electronic circuit or similar method generates an independent alias identifier and associates the alias identifier to the transaction card identifier. Other applications are able to more freely use this alias identifier because the alias is independent of the transaction card identifier (i.e., not invertible to the transaction card identifier). For example, other applications might use the alias identifier to analyze retail-environment aspects of the data sets where the data might be viewed by an unauthorized person without risk of the transaction card identifier being fraudulently derived solely from the alias identifier. For security purposes, the transaction card identifier is encrypted and access to the encrypted transaction card identifier can be restricted.

In another such embodiment, a computer-based method provides sensitive data (i.e. transaction card identifiers) for storage in a database. A computer-based system first encrypts the information using a suitable encryption scheme. Examples of encryption schemes that can be used include, but are not limited to, AES, Data Encryption Standard (DES), and International Data Encryption Algorithm (IDEA). The system formats the resulting encrypted data so that the data conforms to a desired database format. For example, many encryption schemes generate a binary string that can be difficult to read, remember, and store. In one embodiment, the binary string can be converted to a readable form using uuencode, base64, or similar conversion methods. The system stores the formatted data in a database, creates an alias identifier and associates an alias to each piece of formatted data. The system may maintain the association between the alias and the formatted data, regardless of the form of the sensitive data. Thus, the association remains the same whether the data is decrypted, formatted, encrypted or re-encrypted using a different encryption scheme.

An output of the system provides the alias identifier in place of the formatted data for accesses to the database unless the sensitive data is specifically requested by an authorized user. The alias identifiers are independent of the sensitive data in that the sensitive data cannot be derived directly from the alias identifiers. This independence can be implemented using a variety of alias identifier creation techniques such as a randomly generated identifier, a sequentially generated identifier, or a non-invertible derivation of the transaction card identifier. The aliases may also be uniquely associated with exactly one transaction card identifier. In some instances, the user, administrator, or another application using the invention may configure the format of the alias identifiers. For example, the user may designate that the alias identifiers should be formatted to each contain six capital letters or to each contain nine digits (the numbers "6" and "9" being merely illustrative). In another embodiment, the user may designate a portion of the sensitive data that is retained and used as a portion of the alias identifier. In one such example, the system uses the first number of a transaction card identifier as the first number of its corresponding alias.

Using one or more conventional computers arranged to provide a computer data-processing system, access to the database can be performed using various methods. For example, the system may display a graphical user interface (GUI) in order to assist users wishing to input, request or receive data. In one embodiment, the system assigns users of the system user identifications and passwords to verify their identity. The system can be configured to record configuration information related to each user, and the GUI may be tailored to the user once they have successfully provided their user identification (user ID) and password. Other secure access methods can be implemented, such as verifying that the computer accessing the database is authenticated with the local system, verifying that the user logged into the computer has authorization to access the database (e.g., using Microsoft Windows® integrated authentication), implementing a restriction on the number of invalid verification attempts for a user ID, or requiring complex passwords that must be changed periodically. In addition, the GUI interface can be configured to provide access to multiple databases, each having unique access privileges. Upon a finding that any of the authentication variables entered (e.g., server, database name, user ID, or password) is incorrect, an appropriate error message can be generated.

In one application, the system is highly configurable, allowing customization by the user including, but not limited to, the GUI interface, the data fields contained with a record, and the number of users who have access to the database. In another embodiment, the invention allows for a quick query of the database to retrieve and display the data related to either an alias or a transaction card identifier. The system determines the contents of the display through the use of user profile data or by user selections made via a user interface. Depending upon the configuration, the display may show the alias, the encrypted sensitive data element, the unencrypted sensitive data element and other related data. In another embodiment, the system receives either a sensitive data element or an alias as input and provides only the corresponding alias or sensitive data element respectively.

The system also allows the user to search the database for data other than the aliases or sensitive data elements. The results of the search may include the aliases or sensitive data elements related to the search. The system is configurable to display the aliases, the encrypted sensitive data element, the unencrypted sensitive data element, or any combination of aliases and data elements.

The system can be configured to record logs of user activities, such as access attempts related to the sensitive data elements. The system may use these logs for generating a log report that can be used to detect fraudulent accesses and prevent future fraudulent accesses. The type of information stored in log reports varies according to the specific application but may include user ID, event type, time, success/failure indication, IP or Mac address, or account alias.

Where large amounts of sensitive data need to be processed (e.g., conversion of an existing database, modification of the existing key, and merging of another database), it may be beneficial to move the data to an alternate location for processing. For example, a separate database and processing unit could perform the processing, and upon completion of the processing, the data would be sent back to the originating database. A similar method involves storing the aliases and encrypted transaction card identifiers in separate databases. This method reduces the impact of processing the transaction card identifiers upon the use of the aliases and other data.

In one embodiment, a computer-based system generates a hash value for each transaction card identifier or encrypted transaction card identifier. The system uses this hash value for searching, sorting, and similar database-related processes. For instance, the hash value may represent alphanumeric, numeric, or other limited values. The hash value may also represent a compression of the transaction card identifier. Additionally, the system may format the hash value further by using another hash algorithm, such as first using Secure Hash Algorithm (SHA-1) and then using Media Digest Algorithm (MD5). Once the hash value has been created, a database application may use the hash value when accessing the database. For example, to search for a transaction card identifier in the database, the system determines the transaction card identifier hash value for use in finding records that correspond to the hash value. This method can be particularly beneficial when large amounts of data are accessed during initialization or bulk modification of the database and also can increase the security of the database-related processes. This hash creation method is useful to numerous applications, including applications outside of data aliasing.

In another embodiment, the system can store the aliases and related data in one database while storing the transaction card identifiers in another database. Using this method, the database may contain file records composed of several types of information that can be separated into different fields of data, of which one or more fields may be a transaction card identifier or alias. The system can configure one database to store the records with the transaction card identifiers as a field, while the other database is configured to store the aliases in a similar field. This method of implementing two databases allows the access requirements for each database to be controlled separately.

According to another example embodiment, a user can select a user identification and password for accessing to the database. A computer-based system converts the user identification and password into an encrypted file format (e.g., an encrypted XML file or similar format). The user provides the encrypted file to a third party (person or computer-based application) that in turn provides the file to a database management system that is capable of decrypting the file. The database management system (computer-based application or person) uses the decrypted file for configuring the secure access settings of the database during, for example, installation of a database management system. Alternatively, the third party may use the encrypted file after installation to modify the secure access settings of the database. The system then uses the user identification and password to access the database. The user is then able to access the database independently of the database management system using the user identification and password the user originally provided. Additionally, the user and others with appropriate access privileges can access the database through the database management system.

Figure 1:
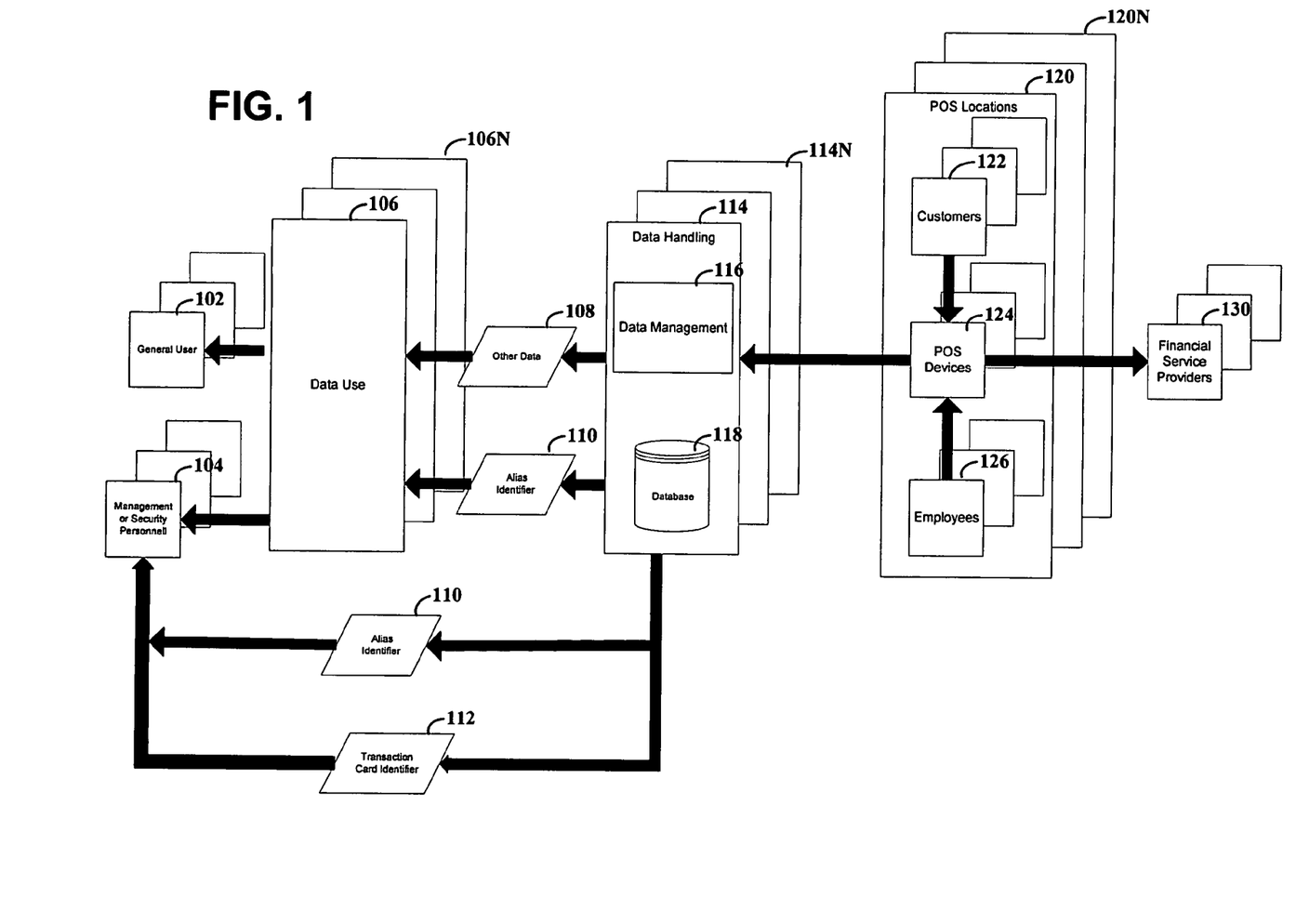
FIG. 1 is an arrangement for storage and utilization of sensitive data, according to an example embodiment of the present invention.

Turning now to the figures, FIG. 1 shows such a computer-based system and method for secure storage and utilization of transaction card identifiers, according to an example embodiment of the present invention. FIG. 1 contains data handling blocks 114 to 114N, point-of-sale (POS) locations 120 to 120N, management/security personnel 104, and financial service providers 130. Numerous environments are envisioned for implementing the system of FIG. 1 (e.g., retail sales environment). As will be discussed in more detail below, FIG. 1 also shows one path for the output of transaction card identifiers 112 and two paths for the output of alias identifiers 110. The system permits the use of the transaction card identifiers based upon access restrictions that are appropriate for transaction card identifiers, while also permitting access to the alias identifiers based upon access restrictions that are appropriate for the alias identifiers. Typically, the appropriate access restrictions are less stringent for the alias identifiers allowing for a wider range of possible uses for the alias identifiers.

In a retail sales environment, the POS locations 120 to 120N have one or more POS devices 124. The POS devices 124 generally perform retail transactions, including the sale of goods to customers 122 (e.g., sale using a cash register or Internet sales using a computer). In many applications the POS devices include computers for recording, verifying and other related transaction processing tasks. Often the transactions involve transaction card identifiers provided by customers 122 and received by employees 126. Unless otherwise stated, transaction card identifiers, as used herein, include numbers, letters, symbols, or other representations. When a card holder uses a transaction card for a purchase, a financial service provider associated with the particular transaction card verifies and records the transaction card's status. To this end, POS devices often use standard telephony communication means, such as a telephone or an Internet connection, to transmit financial identifiers to the financial service providers 130.

In addition to sending financial identifiers to financial service providers 130, the POS devices send financial identifiers and additional transaction information to data handling blocks 114 to 114N. The system may optionally store the transaction information and the financial identifiers in a database (or memory) 118. Database 118, or other data-retaining circuitry, may be implemented using several distinct structures or using a single structure containing several types of information.

Prior to storing the encrypted data in database 118, data management 116 encrypts the financial identifiers. In addition, the system associates the financial identifiers with alias identifiers generated as shown at data management 116. The encryption and alias assignment may be implemented at POS devices 124 or in one or more distinct devices physically located in separate locations.

The data in database 118 is accessible for use by, for example, other systems, programs, displays, or additional storage as shown by blocks 106 to 106N. In one embodiment, the alias identifiers 110 are available for use in several instances where the transaction card identifiers 112 are not available, as shown by general users 102 and data use blocks 106 to 106N. For example, many retailers use behavior policing for prevention and monitoring of employee or customer theft and other undesired losses. Behavioral policing is accomplished by an analysis of multiple types of transaction-related data (block 108) that often includes the transaction card identifiers. When a behavioral policing application uses transaction card identifiers, the application should implement sufficient security precautions. To reduce the necessary security precautions/risks, behavioral policing applications (and other applications) can perform the data analysis using alias identifiers 110 in place of the transaction card identifiers 112. In some instances it may still be necessary to use the transaction card identifiers 112; therefore, the system allows users with authorized access (management or security personnel 104) to view transaction card identifiers 112.

Numerous other implementations are envisioned with these components. For example, POS locations 120 may be any number of locations or only a single location. Thus, the POS locations might correspond to cash registers in multiple stores or to computers used in Internet sales. Similarly, data handling blocks 114 may be either a single location or multiple locations. POS locations 120 may be located at either the same or different locations as data handling blocks 114. It is possible that the entire system depicted in FIG. 1 could be located at a single location (e.g., where a financial service provider provides POS or similar services at its location). In another embodiment, the financial service providers can use a database management and storage similar to data handling block 114.

Figure 2:
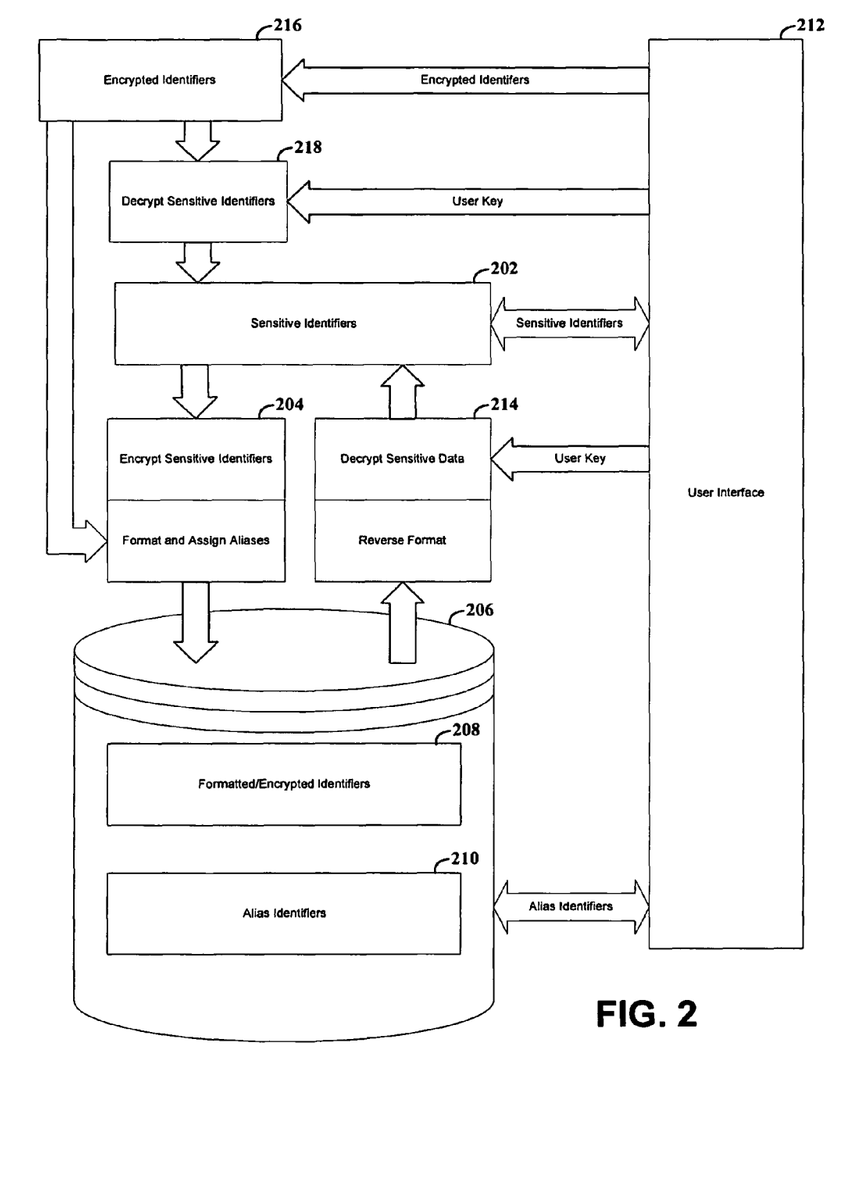
FIG. 2 is an example embodiment illustrating one acceptable way to implement block 114 of FIG. 1.

FIG. 2 shows an example embodiment of data handling block 114 (as implemented by a computer-based system) for storage and utilization of sensitive data, as well as for providing access to aliases representing transaction card identifiers. The sensitive identifiers and alias identifiers are accessible through user interface 212. The user interface may be implemented as a single software interface, multiple software interfaces, or through a number of computer hardware interfaces or circuits. Based upon the access requirements rules, user profiles or other factors, the user interface may provide the aliases or sensitive identifiers for use by, for example, another computer-based system.

In one embodiment, encryption block 204 and decryption block 214 are implemented with a single device capable of both encryption and decryption of data. In other embodiments, encryption block 204 may be implemented using multiple devices (e.g., one for encryption and one for decryption). User interface 212 can also be implemented using one or more devices. The combination of user interface 212, encryption block 204, and decryption block 214 may be implemented with a single device or as a number of device combinations.

User interface 212 serves several purposes. One purpose is the collection of data, some of which may be sensitive data. The data collected may take many different forms and can be collected using any number of methods. For example, in retail environments the data may include transaction identifiers relating to transaction card purchases that are collected from a register, or alternatively, the transaction identifiers may be collected from Internet purchases.

The arrangement of FIG. 2 is capable of accepting the sensitive information in two forms: encrypted (block 216) or non-encrypted (block 202). The computer based system determines whether the data received is encrypted using an acceptable method. Using one such method, the system compares the format of the data received with the encrypted form of the sensitive data and the unencrypted form of the sensitive data (e.g., the length or content of the received data). According to another method, the system receives an indication of the data format along with the data, such as a data bit or byte that indicates the format of the sensitive data. Various other methods may also be used, such as determining the source of the data.

When the received sensitive information is encrypted, the arrangement decrypts the data at block 218. The decryption algorithm of block 218 may be implemented using several methods. For instance, the decryption algorithm may be implemented without passing the decrypted information through user interface 212 where block 218 contains the necessary decryption algorithm and, if necessary, requests the key for decrypting the information from user interface 212. Some methods of encrypting data implement a key that changes for each set of encryption data (e.g., where the key is based upon the time of encryption). Thus, it is often necessary to retrieve a key for each piece of encrypted data. Using another method, the system performs the decryption performed upon the data after it is passed through user interface 212. This method permits the user to maintain the functionality of decryption block 218 independent of the FIG. 2 arrangement. Using yet another method, the system passes the encrypted data directly to the formatting stage of block 204. This method may be implemented, for example, in situations where the encryption and decryption algorithms at blocks 204 and 214 correspond to the algorithm originally used in providing the encrypted data 216.

When the system collects sensitive data 202 from user interface 212 or decryption block 218, the system first modifies the data using a suitable encryption scheme, as depicted by encryption block 204. Several encryption schemes use a key to both encrypt and decrypt data. This key can be supplied through the user interface 212. The control of the key through user interface 212 permits the user or another application to maintain flexibility in how the data is encrypted if, for example, the user or application determines that the key should be changed for security or other reasons. While control of the key provides flexibility, it also introduces the possibility of user error. For example, if the user provides the wrong key through user interface 212, the output of decryption block 218 would be unusable. This is particularly troublesome when performing operations on large amounts of data, such as when the encryption key is changed by the user. Thus, one embodiment of the current invention verifies that the key entered by the user matches the key that was used to encrypt the data. This may be accomplished by a number of different methods, such as storing an encrypted version of the key or a hash value of the key and comparing the stored version of the key to the encrypted version or hash value of the subsequently entered key.

Often it is desirable that the encrypted data be formatted to facilitate data storage and manipulation. For example, if AES cryptography is used, a binary string is generated that is not easily read or manipulated. This binary string can be converted to American Standard Code for Information Interchange (ASCII) or similar format using a number of known methods (e.g., uuencode and base64).

At block 204, the system also generates alias identifier 210 for association with sensitive data 202. Typically, the alias identifier is randomly generated, but it also can be generated by other means, such as a sequential generation or by generating a hash value of the sensitive data. The system then stores the alias identifier and encrypted data in database 206. In an example embodiment, the user of the invention determines the format of the alias identifier. In another embodiment, the alias identifier has the same format as the original sensitive data. For example, if the sensitive information represents transaction card identifiers and the transaction card identifiers are sixteen digits long, the alias identifier will also be sixteen digits long.

After the encrypted data and the alias identifier are generated, the system can store the data in database 206 for use through user interface 212. Typically, when user interface 212 requests data, the database supplies alias identifier 210 instead of data in encrypted data base 206. In this manner, database 206 can be used without supplying the original sensitive data 202 or the encrypted data 208. For example, where the database contains transaction card identifiers, the database can be searched for suspicious transaction card activity using the alias identifier instead of the actual transaction card identifiers.

In one embodiment, user interface 212 requests the original sensitive data 202. Typically, user interface 212 limits access to the original sensitive data through any well known authorization techniques (e.g., password protection). When there is an authorized request for sensitive data 202, database 206 sends the encrypted data 208 to block 214. At block 214, the system reverses the formatting and encryption of block 204 to the encrypted data, resulting in the original sensitive data 202. The system then sends this data to user interface 212.

In another example embodiment, a requestor (e.g., a computer system or a person) provides an alias identifier via user interface 212, and also requests the associated encrypted data. The data stored in database 206 indicates, through a cross-reference table or similar method, the encrypted data that corresponds to the requested alias. The corresponding encrypted data is provided to block 214 where the sensitive data is recovered by formatting and decrypting the data.

In yet another example of a request involving sensitive data, a requestor enters the sensitive data and the system identifies the corresponding alias identifier. The system encrypts the entered sensitive data and formats the data as shown in block 204. The database is searched for any information matching the resulting encrypted and formatted data. If a match is found, the system provides the alias identifier indicated by the database as corresponding to the matched data to the requestor.

For security and other reasons, it is sometimes useful to change the encryption key used to create the encrypted data stored in the database; for example the user may supply a new key or a new encryption algorithm (or both), and all new data will be encrypted using the new key or algorithm. In addition, all the existing encrypted data can also be encrypted using the new key without assigning new aliases to the existing data. Certain embodiments of the present invention allow for the existing data (encrypted data 210) to be encrypted using the new key or algorithm without changing the correlation between the existing data and the alias identifier 210. Therefore, an external application of the database using the alias identifier 210 does not need to be updated when the encryption is changed. One method of maintaining the association involves implementing a cross-reference table between the aliases and the database. Various other methods exists, including retrieving the alias identifier for each encrypted identifier prior to changing the encryption of the encrypted identifier for use after the encryption has been changed.

In another situation, the user of the computer-based system or method may have a preexisting database of transaction card identifiers and related data. The system decrypts (if necessary) and encrypts the existing transaction card identifiers and generates aliases. The existing (or another) physical database can be used to store the resultant aliases and encrypted transaction card identifiers. This conversion of the database can often be facilitated by generating hash values for the encrypted transaction card identifiers because, as discussed above, searching functions can be improved by using the hash values rather than the encrypted transaction card identifiers directly.

Figure 3:
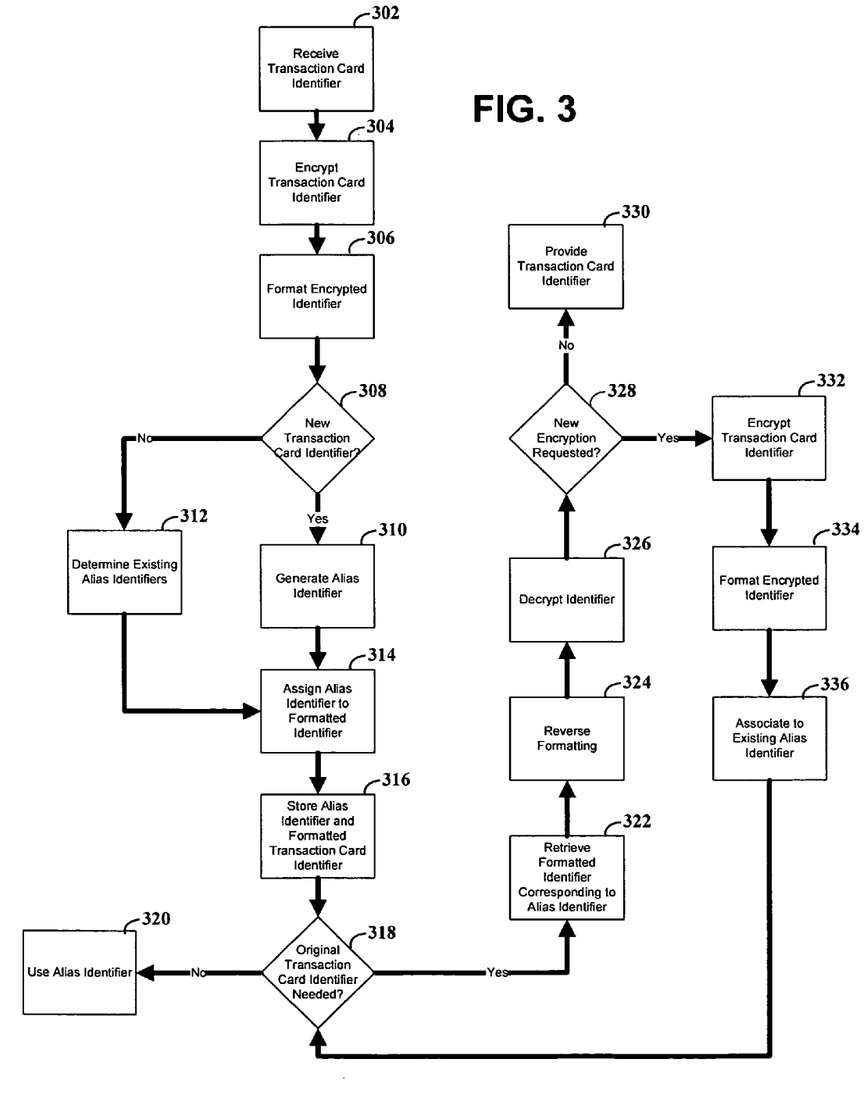
FIG. 3 is a flow diagram for storage and utilization of sensitive data, according to an example embodiment of the present invention.

FIG. 3 is a flow diagram according to another example embodiment of the present invention. The system receives transaction card identifiers as depicted at block 302. Alternately, the system may first receive the transaction card numbers in an encrypted form and decrypt the transaction card numbers by the method discussed in relation to FIG. 2, blocks 216 and 218. In either case, the system subsequently encrypts the transaction card identifiers as shown at block 304. As mentioned above, this encryption can be implemented using a number of different encryption algorithms. Optionally, the system formats the encrypted transaction card identifiers from block 304 as depicted at block 306. An example implementation of the steps performed at blocks 304 and 306, the system uses AES encryption at block 304 and uuencode formatting at block 306.

At block 308, the system checks the transaction card identifier against previously stored transaction card identifiers. If the system finds a match between the current transaction card identifier and a stored transaction card identifier, the system uses the alias for the matching stored transaction card identifier to the current transaction card identifier's alias as depicted at block 312. If no match is found, the system generates a new alias as depicted at block 310. The new alias may be randomly generated, or it may be provided using other methods, such as sequential generation. The aliases provided can be of a format that is the same or similar to the original transaction card identifier, or they may have an entirely new format. In one embodiment, a portion of the transaction card identifier received at block 302 may be used as a portion of the alias; for example, a portion of a credit card number identifying the financial service provider may be used as part of the alias. This allows the financial service provider to be identified from the alias. Other data may also be maintained by similar methods depending upon the configuration of the alias. After the system assigns the new or existing alias (block 314), the system stores the transaction card identifier along with the alias at block 316.

The system bases the decision at block 318 upon whether an access to the database involves the original transaction card identifier or only the alias identifier. When the system determines that an alias identifier is required, the system supplies the alias, as shown at block 320. Often, the system allows access to the alias identifier to a requestor while still restricting access to the original transaction card identifier. Numerous methods involve accessing an original transaction card identifier. One such method is to provide an alias identifier associated with the original transaction card identifier being requested. Another method is to access transaction identifiers associated with other data (e.g., all transaction identifiers from a financial service provider or a customer). Yet another method involves changing the encryption of the stored transaction card identifiers. Using these and other methods, once it is determined what formatted data is being requested, the system retrieves the formatted data from the database at step 322.

Next, the system reverses the formatting of block 314 as depicted at block 324. From block 324, the system decrypts the transaction card identifier at block 326. If a key was provided for encrypting in block 308, the key can also be provided for used at block 326. The decryption of block 326 produces the original transaction card identifier.

Decision block 328 determines whether the purpose of the request is to change the encryption of the transaction card identifier. The system can determine the purpose of the request based upon the information provided within or in conjunction with the request. If the purpose is something other than changing the encryption, the system provides the transaction card identifier to the requestor at block 330. If, however, the purpose is to change the encryption of the transaction card identifier, the system encrypts the transaction card identifier using the new algorithm/key as shown at block 332. The system then formats encrypted transaction card identifier from block 332 as shown at block 334. The formatting may be the same as the formatting performed at block 306, or a new formatting may be implemented. Block 336 maintains association between the transaction card identifier and its alias. Thus, this method allows the transaction card identifier encryption to be modified without modification of the alias. Accordingly, applications that use the alias identifier (block 320) can continue to use the same alias even when the encryption of a transaction identifier is modified.

Figure 4:
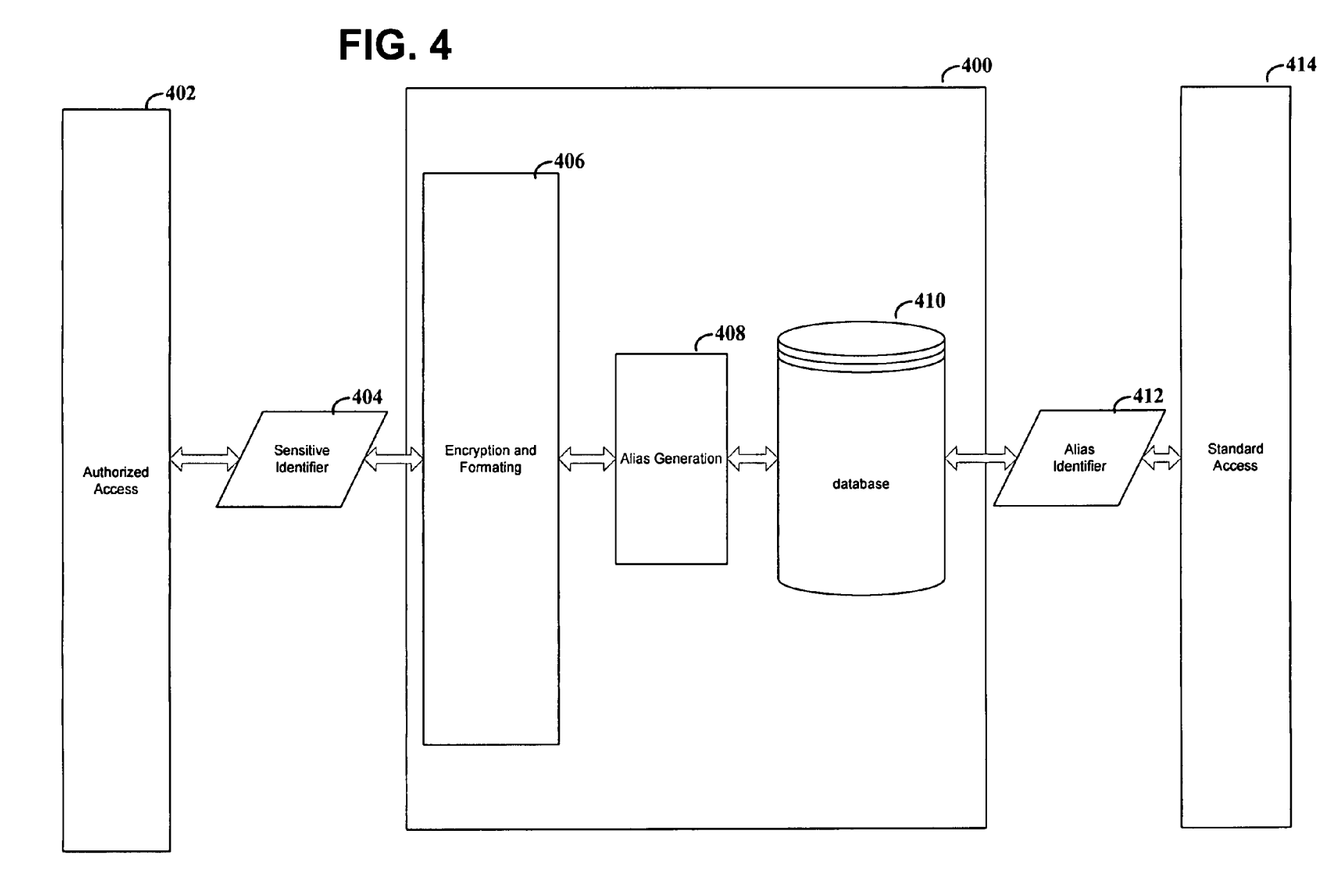
FIG. 4 is an arrangement implementing secure access and storage of sensitive data, according to an example embodiment of the present invention.

FIG. 4 is an arrangement implementing secure access and storage of sensitive data. FIG. 4 contains authorized access 402, standard access 414, and arrangement 400. Authorized access 402 represents access requests that are restricted through proper security measures. Standard access 414 represents access requests having different, if any, restrictions from those implemented for authorized access 402. Arrangement 400 represents the process for storing and accessing sensitive data, as well as for creating and accessing alias identifier.

Authorized access 402 involves access to the sensitive identifiers 404, and therefore, involves an appropriate level of security to restrict access using varying levels of sophistication. A simple security restriction may require a password to allow access. More elaborate measures may include biometric security systems, access cards, or physically limiting access to the arrangement 400.

Standard access 414 involves access to the alias identifier 412, and therefore, does not always involve the same level of security implemented in authorized access 402. In fact, it is possible that access to the alias identifier 412 can be unsecured. Even if the standard access 414 does involve some level of security, it may be of a different level than authorized access 402. Another possible distinction between the accesses involves the set of users who are granted access to each. For example, security personnel might be granted access to both the authorized access 402 and the standard access 414, while inventory personnel are only granted access to the standard access 414.

As can be seen from FIG. 4, the alias identifier can be directly provided to a requestor because the alias identifier can be stored in a non-encrypted form. Access to the sensitive data, however, involves a decryption for reading the data and an encryption for writing the data, as shown in block 406. In some embodiments, the data is also formatted in block 406.

Block 408 generates and assigns alias identifiers to the encrypted data received from block 406. When sensitive information is requested from the database 410 using alias identifiers, block 408 can also determine the sensitive data that is associated with the provided alias identifier. The sensitive data is then decrypted at block 406 and provided to authorized access 402.

For additional information regarding implementations of a retail database management system and applications for the use of retail database management systems, reference can be made, for example, to U.S. Provisional Patent Application No. 60/763,048 filed on Jan. 27, 2006 and entitled: "Sensitive Data Aliasing and Implementations Thereof" including its appendices A-D; to U.S. patent application Ser. No. 11/372,750 filed on Mar. 10, 2006 and entitled: "Sensitive Data Aliasing" to Duhaime et al; and to U.S. Pat. No. 6,847,393 issued on Jan. 25, 2005 and entitled: "Method and system for monitoring point of sale exceptions."

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For instance, such changes may include assigning multiple alias identifiers to the same transaction card identifier. Other changes may include implementing more than one database and storing the sensitive information in one database and the alias in another database. Such modifications and changes do not depart from the true spirit and scope of the present invention, which is set forth in the following claims.

What is claimed is:

1. A method of using data sets associated with transaction card identifiers directed for use in a retail environment, the method being implemented by a computer-based circuit configured and software-programmed to perform the steps of:
   accessing, by the computer-based circuit, alias identifiers that represent the transaction card identifiers;
   associating the alias identifiers to encrypted forms of the transaction card identifiers;
   using the alias identifiers to analyze retail-environment aspects of the data sets, and generating user-directed output therefrom, independent of the transaction card identifiers and the encrypted forms of the transaction card identifiers;
   decrypting the encrypted forms of the transaction card identifiers;
   subsequently encrypting the transaction card identifiers using a second encryption method;
   maintaining the association between alias identifiers and the transaction card identifiers; and
   formatting the transaction card, or the alias, identifiers to represent displayable characters.

2. A database processing arrangement for using data sets associated with transaction card identifiers directed for use in a retail environment, the arrangement comprising:
   a database, accessible by a computer-based circuit, for storing the data sets and wherein the data sets include transaction card identifiers;
   an encryption arrangement for encrypting the transaction card identifiers using a first encryption scheme;
   an alias generator for generating aliases and associating the aliases to the transaction card identifiers;
   an interface for access to the database by the computer-based circuit, wherein the encryption arrangement performs a re-encryption function that:
      decrypts the encrypted forms of transaction card identifiers;
      subsequently encrypts the transaction card identifiers using a second encryption scheme; and
      maintains the association between aliases and the transaction card identifiers.

3. The database processing arrangement of claim 2, wherein in response to input from the interface, the encryption arrangement encrypts all of the transaction card identifiers in the database using the second encryption scheme.

4. The database processing arrangement of claim 3, wherein the encryption arrangement uses a first key to perform the first encryption scheme and a second key to perform the second encryption scheme.

5. The database processing arrangement of claim 3, wherein:
   the encryption arrangement uses a first key to perform the first encryption scheme;
   a second key to perform the second encryption scheme; and
   both the first and second keys are input through the interface.

6. A database processing arrangement for using data sets associated with transaction card identifiers directed for use in a retail environment, the arrangement comprising:
   a database, accessible by a computer-based circuit, for storing the data sets and wherein the data sets include transaction card identifiers;
   an encryption arrangement for encrypting the transaction card identifiers using a first encryption scheme;
   an alias generator for generating aliases and associating the aliases to the transaction card identifiers;
   an interface for access to the database by the computer-based circuit, wherein the interface:
      restricts access to the transaction card identifiers to a set of authorized users; and
      provides the aliases in place of the transaction card identifiers for a set of standard users, wherein at least some of the standard users are not included in the set of authorized users.

* * * * *

UNITED STATES PATENT AND TRADEMARK OFFICE
CERTIFICATE OF CORRECTION

Page 1 of 1

PATENT NO. : 7,873,577 B1
APPLICATION NO. : 11/372736
DATED : January 18, 2011
INVENTOR(S) : Duhaime et al.

It is certified that error appears in the above-identified patent and that said Letters Patent is hereby corrected as shown below:

In the Specification

Col. 10, line 33: "(encrypted data 210)" should read -- (encrypted data 208) --.

Signed and Sealed this
Seventeenth Day of June, 2014

Michelle K. Lee
*Deputy Director of the United States Patent and Trademark Office*